United States Patent
Camelo et al.

(10) Patent No.: US 6,217,250 B1
(45) Date of Patent: Apr. 17, 2001

(54) APPARATUS FOR JOINING A POWDER METAL BLANK TO A PIN

(75) Inventors: Carlos E. Camelo, Worcester; Thomas M. Donohue, Spencer, both of MA (US)

(73) Assignee: The Presmet Corporation, Worcester, MA (US)

( * ) Notice: Subject to any disclaimer, the term of this patent is extended or adjusted under 35 U.S.C. 154(b) by 0 days.

(21) Appl. No.: 09/197,601

(22) Filed: Nov. 23, 1998

Related U.S. Application Data (63) Continuation-in-part of application No. 08/527,521, filed on Sep. 13, 1995, now abandoned.

(51) Int. Cl.$^7$ .................................................. F16B 11/00
(52) U.S. Cl. ........................................ 403/278; 403/282
(58) Field of Search .................................. 403/281, 279, 403/278, 274, 249, 253; 428/544

(56) References Cited

U.S. PATENT DOCUMENTS

| | | |
|---|---|---|
| 1,941,992 | 1/1934 | Makenny . |
| 2,322,538 | 6/1943 | Muther . |
| 2,640,617 | 6/1953 | Spicer . |
| 2,972,184 | 2/1961 | Andrew . |
| 3,029,176 | 4/1962 | Schoonmaker . |
| 3,121,281 | 2/1964 | Petro . |
| 3,270,405 | 9/1966 | Webster . |
| 3,434,303 | * 3/1969 | Leyer ................................ 403/253 X |
| 3,699,637 | 10/1972 | Rosiek . |
| 3,897,531 | * 7/1975 | Overhoff et al. ..................... 264/109 |
| 4,026,657 | * 5/1977 | Chmura ................................ 403/122 |
| 5,177,991 | 1/1993 | Sansoucy . |
| 5,247,737 | 9/1993 | Perry et al. . |
| 5,400,500 | 3/1995 | Behnke et al. . |

* cited by examiner

Primary Examiner—Lynne H. Browne
Assistant Examiner—John R. Cottingham
(74) Attorney, Agent, or Firm—Darby & Darby (57) ABSTRACT

An initially separate blank and pin, where the blank one is formed of powdered metal, and is joined to the pin compressing and locally densifying the blank so that a deviation from perpendicularity of the joined pin to the blank is less than or equal to approximately 0.00120" at a distance of approximately 0.4" from a planar first surface. In accordance with a further embodiment, the blank is formed of powder metal and is joined to the pin by compressing the blank so that for a process limit of approximately 0.00120" at a distance of approximately 0.4" from a planar first surface, a capability index of the joined pin to the blank is greater than or equal to approximately 2.00.

22 Claims, 6 Drawing Sheets

APPARATUS FOR JOINING A POWDER METAL BLANK TO A PIN

"This is a continuation-in-part, of application Ser. No. 08/527,521 now abandon, filed Sep. 13, 1995. Each of these prior applications is hereby incorporated herein by reference, in its entirety."

BACKGROUND OF THE INVENTION

1. Field of the Invention

The present invention relates to a method of, and an apparatus for, joining a powder metal blank to a pin. More particularly, the present invention relates to a method of, and an apparatus for, joining a pin to a cover blank for use as an inlet cover of a fuel pump of an internal combustion engine.

2. Discussion of the Related Art

A joined disk-shaped blank and pin are known to be used in an intake chamber of an automotive fuel pump. The inlet cover has a pin on which a gerotor gear assembly is mounted. Thus, if the pin is not joined to the blank in an exact perpendicular relationship with respect to a central plane of the blank, heat will build up during the actuation of the pump because of friction and the motor will require more current to actuate the pump. In addition, reduced perpendicularity creates unacceptable noise and vibration.

A conventional method of making the joined blank and pin includes first separately making the blank and pin. Thereafter, the blank's two end face surfaces are lapped so that they are flat. A center hole is then accurately bored into the blank. The pin is then press fit to the blank in a separate conventional press fitting operation. A drawback of this method is that the degree of precision of the connection between the pin and the blank is not very high. As pointed out above, the pin should be perpendicular with respect to the flat planar surfaces of the blank. However, due to the low precision of the conventional manufacturing method, the pin is frequently not joined exactly perpendicular to the surface of the blank causing, inter alia, the pin to wear prematurely, reduced torque efficiency, excess noise during the operation of the fuel pump and the use of a larger amount of energy than is necessary to actuate the pump. In addition, the prior method is time consuming and costly because of the many steps required.

SUMMARY OF THE INVENTION

A principle object of this present invention is to overcome the above mentioned drawbacks and to provide an improved method and apparatus which joins the cover blank and pin in an accurate position so that the pin is located precisely perpendicularly with respect to the axial end surfaces of the blank. Additionally, the precise axial position of the pin with respect to the blank is also set during the same manufacturing step. Further, the process is rapid and economic.

This and other objects and advantages of the present invention are obtained in an apparatus in which an initially separate blank and pin, where the blank is formed of powdered metal, and is joined to the pin by compressing and locally densifying the blank so that a deviation from perpendicularity of the joined pin to the blank is less than or equal to approximately 0.00110" at a distance of approximately 0.4" from a planar first surface of the blank. In accordance with a further embodiment, the blank is formed of powder metal and is joined to the pin by compressing the blank so that for a process limit of approximately 0.00120" at a distance of approximately 0.4" from a planar first surface of the blank, a capability index (Cpk) of a sample of joined pins to blanks is greater than or equal to approximately 2.00.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Referring now to FIGS. 1–15, the apparatus which is used to join a press metal blank 10 to a pin member 12, is illustrated. The press metal blank 10 is preferably made from powdered iron and contains approximately 0.55% carbon as well as a dry lubricant. The press metal blank is formed by sintering, i.e., by pressing the blank together at high pressure to create a metal-like substance having a disk shape. The density of the press metal is preferably approximately 6.75 g/cc (before being joined to the pin). After the pressing operation, the density of the blank will increase slightly. The pins are preferably made of steel. However, the pins can also be formed from carbide, which is another form of powdered metal.

Figure 1:
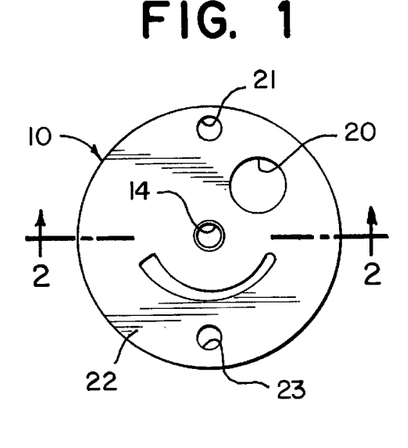
FIG. 1 is a plan view of a blank according to the present invention.
Figure 2:
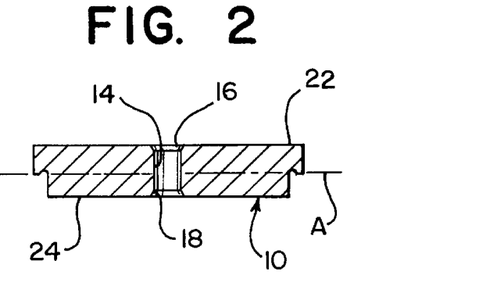
FIG. 2 is a cross-sectional view taken along lines 2—2 of FIG. 1 and looking in the direction of the arrows.
Figure 3:
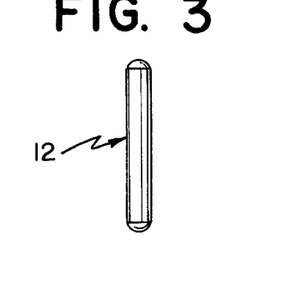
FIG. 3 is a side view of a pin member.

The blank 10 is formed having a center throughbore 14. Throughbore 14 has a chamfered portion 16, 18 (FIG. 2) disposed at each axial end of the bore. Blank 10 also has offset throughbores 20, 21, 23 which are used for alignment purposes to be described below. The blank has a top surface 22 and a bottom surface 24, both of which are flat (i.e., planar) and are disposed perpendicular with respect to the center bore 14. The blanks 10 are symmetrical about center plane A.

Figures 5, 16:
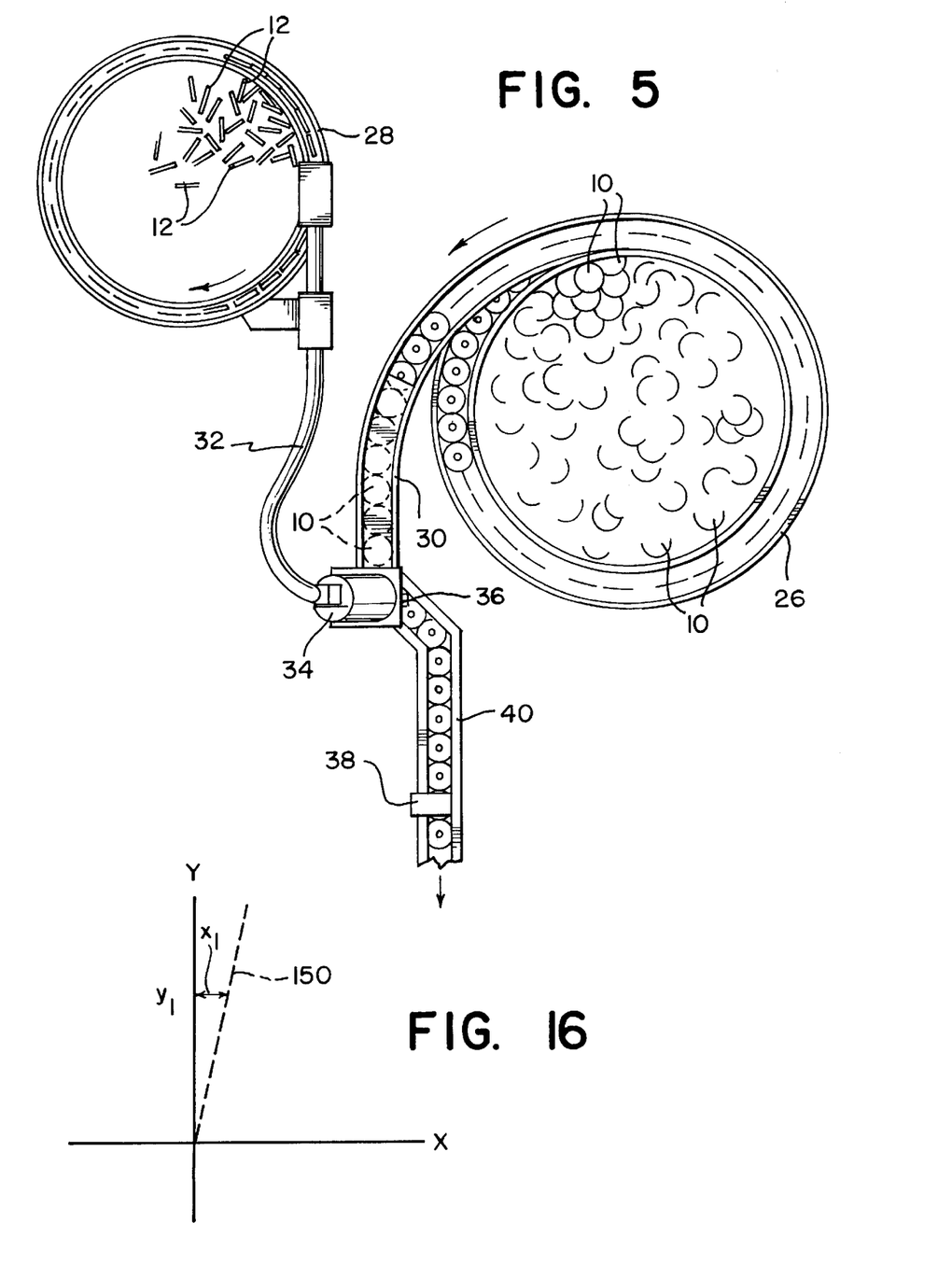
FIG. 5 is a plan view of the separate vibrating bowls for the blanks and pins, the insertion station and the track leading from the insertion station to the rotating table.
FIG. 16 is a schematic view illustrating how the deviation from perpendicularity of the joined blank to the pin is measured.

As shown in FIG. 5, a plurality of blanks 10 are collected in a vibrating bowl 26 and a plurality of pins 12 are similarly collected within a vibrating bowl 28. The vibrating bowls 26, 28 each vibrate so that the blanks 10 and pins 12 will line up and be fed one at a time into the first end of the tracks 30, 32, respectively. Tracks 30, 32 lead to an insertion station 34 where a single pin 12 (FIG. 3) is fitted into the center bore 14 of a single blank 10. The longitudinal axis of pin 12 is substantially perpendicular with respect to the planar top and bottom surfaces 22, 24 of blank 10. The insertion station essentially feeds the pin into the center throughbore 14 of the blank while the blank is held stationary. The throughbore is large enough to allow insertion of the pin, but small enough so the pin 12 fits snugly within bore 14 due to the close tolerance between the outer diameter of pin 12 and the inner diameter of bore 14. However, this snug fit does not establish a fixed connection between the blank 10 and the pin 12 but only ensures that the pin will not be displaced with respect to the blank during the remaining processing of the assembled pin and blank.

The insertion station also includes a sensor 36 to ensure that the pin 12 is actually mounted within the center bore of pin 10. Sensor 36 may, for example, be a magnetic switch if the pins are made of steel or other magnetic material. A second sensor 38 can be used to ensure that track 40, downstream from the insertion station 34, is full of assembled blanks and pins.

Figure 6:
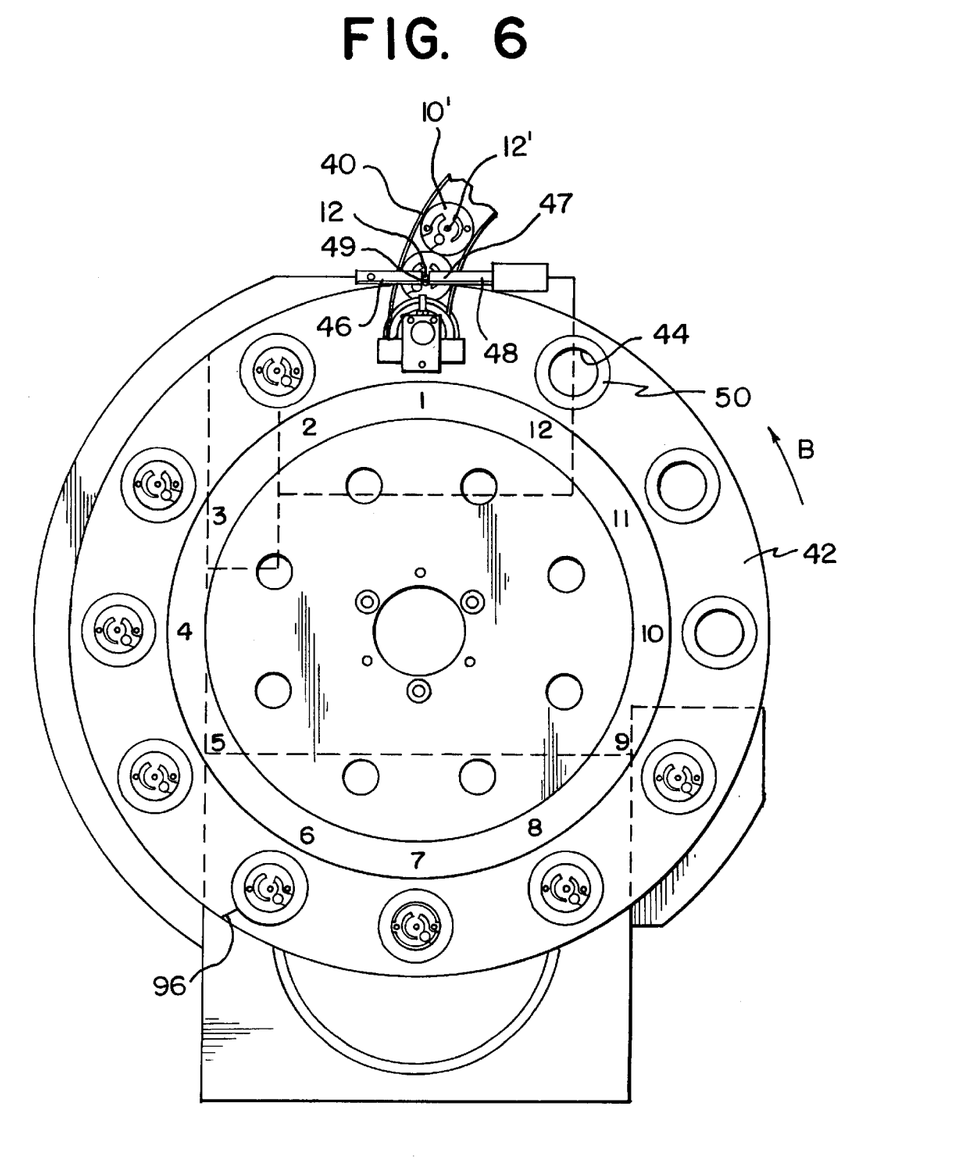
FIG. 6 is a plan view of the rotating table.

Track 40 delivers the assembled blanks and pins to the rotary table 42 as illustrated in FIG. 6. Just prior to the location where the assembled blanks and pins are inserted on the rotary table 42, an escapement tool 48 is disposed, which tool acts as a gate to ensure that only one assembled blank and pin is inserted into an open cavity 44 of the rotary table 42 when required. Escapement tool 48 includes a plunger 47 that has a notch 49 which is about the circumference of the pin. Plunger 47 is radially movable with respect to the blank 10 so as to push the pin 12 against a sensor 46 to ensure that pin 12 is, in fact, disposed in blank 10. The rotary table rotates, in a step wise manner, in the counterclockwise direction, as indicated by arrow B in FIG. 6, so that the open cavity 44, which is in station twelve moves to station number one. Once the empty cavity is received in station number one and the table 42 stops rotating, plunger 47 reciprocates so that it retracts and extends quickly to permit only one of the assembled blanks and pins to move forward from the escapement tool 48 along track 40 so as to be received within cavity 44. Plunger 48 extends forward to engage the pin of the next blank and pin assembly, which has been labeled 10', 12' in FIG. 6.

Cavities 44 in the table are internal cylindrical surfaces of cylinders 50 which extend through the rotary table 42 from its upper surface 52. See FIG. 7. In a preferred embodiment, the rotary table 42 includes twelve cylinders 50 (one cylinder corresponding to each of the twelve stations) and as the table rotates in the direction indicated by arrow B, the cylinders advance to each of the stations numbered one through twelve, in consecutive order.

Figure 7:
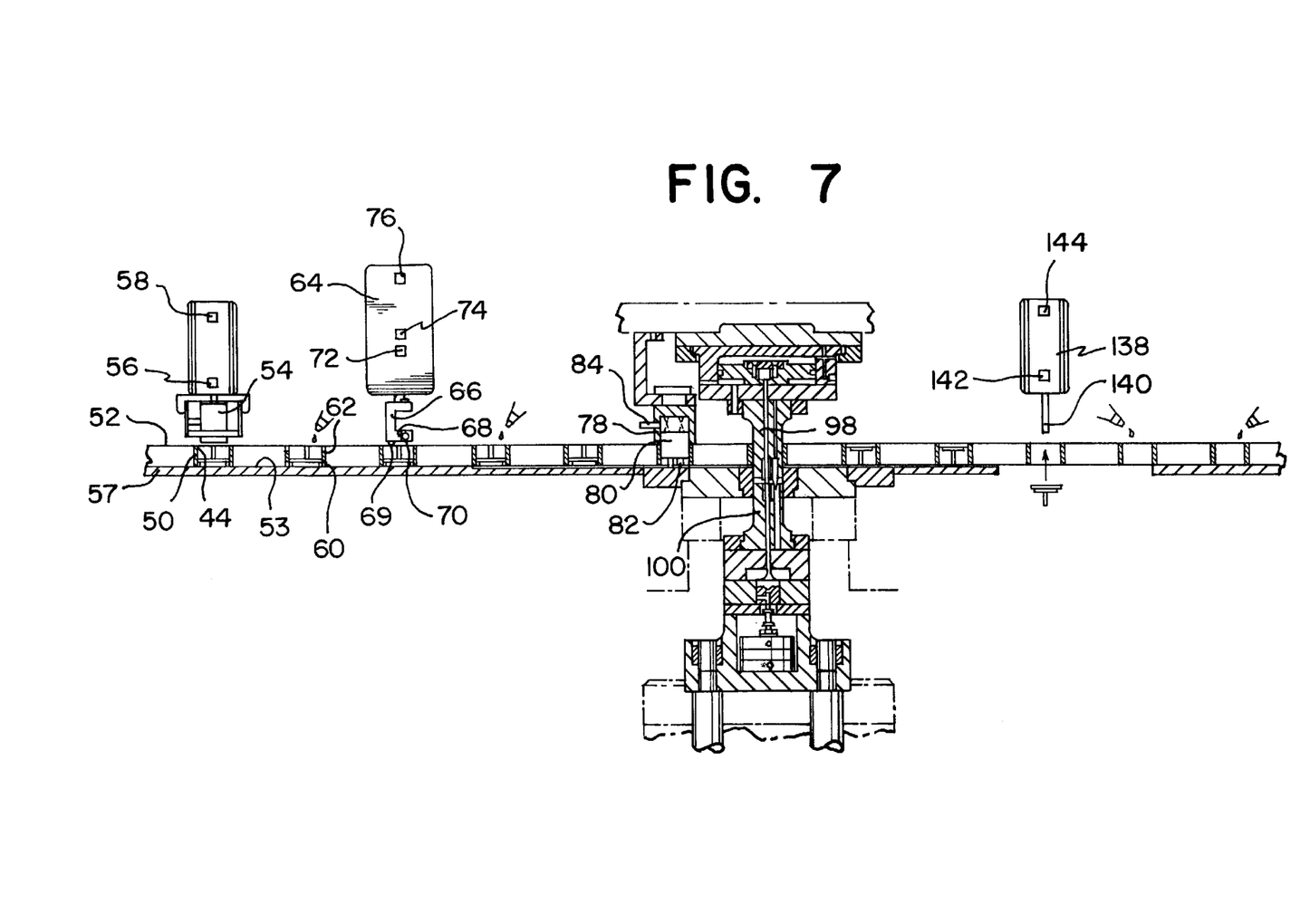
FIG. 7 is a schematic linear view of the twelve stations of the rotating table.

Each of the cylinder 50 have a set of magnets 62 at its top, adjacent table surface 52, and a set of magnets 60 toward its bottom surface 53. These magnets can hold the blank in an upper or lower position in the cylinder 50.

FIG. 6 shows that station number one is the automatic loading station which receives the assembled blank and pin released from the escapement tool 48. The assembled blank and pin are inserted within cylinder 50 and pushed down so the blank 10 is captured by the lower magnets adjacent on the bottom surface 53 of the rotary table 42, as illustrated in station number one of FIG. 7. This rotary table is just above a stationary table 57.

Station number one includes a cylinder 54 which detects if the assembled blank and pin have been properly seated within cylinder 50. Once the assembled blank and pin have been inserted into the cylinder 50, cylinder 54 travels downwardly until the lower axial surface of cylinder 54 contacts the upper distal end of pin 12. The cylinder housing includes a first reed switch 56 and a second reed switch 58. If the assembled blank and pin are in the proper position, cylinder 54 will actuate the first reed switch 56, which generates a signal to the central system (not shown) indicating that the assembled blank and pin are properly seated within cylinder 50. However, if the blank and pin are not properly positioned within cylinder 50, reed switch 56 will not be actuated, thus indicating to the control system that the assembled blank and pin are not properly positioned within cylinder 50. If the first reed switch 56 is actuated, cylinder 54 retracts, actuating reed switch 58 which indicates to the control system that the assembled blank and pin have been properly seated within cylinder 50 at station number one and that cylinder 54 has retracted to a predetermined position so that rotary table 42 can advance the twelve cavities to their next respective station.

Once the remaining stations have indicated to the control system that they have completed their respective operating steps and are in a proper retracted position, table 42 rotates so that the assembled blank and pin move to station number two. Station number two is a free station. However, in a preferred embodiment lubricant is applied to the blank and pin at station number two.

The assembled blank and pin then move from station number two to station number three which includes an orientation device 64. Orientation device 64 includes a C-shaped bracket 66 that has a throughbore 68 disposed in its lower leg. The C-shaped bracket 66 is lowered so that bore 68 surrounds pin 12. Thereafter, bracket 66 rotates about pin 12 by as much as 360° until the offset hole 20 in blank 10 is located by a downwardly depending projection 69 on the lower surface 70 of the lower leg. Once the off center hole 20 is located and projection 69 engages in offset hole 20, the C-shaped bracket 66 rotates further to a predetermined angular position so that the assembled blank and pin are disposed in a preferred predetermined angular position with respect to cylinder 50. The orientation device contains three sensors 72, 74, 76. Sensor 72 indicates when the assembled blank and pin has been rotated to the proper angular orientation. Sensor 74 indicates when the probe is on top of the blank 10 so that bore 68 surrounds pin 12, and sensor 76 indicates that the C-shaped bracket 66 has been retracted to a safe position so that the rotary table 42 can rotate to the next station.

Stations four and five are free stations. However, in station number four, lubricant is preferably reapplied to the assembled blank and pin. Station number six includes an orientation check to ensure that the assembled blank and pin are still in the proper angular orientation, which was previously set in station number three.

It should be noted that the magnets 60, 62 are strong enough to hold the blank against rotation so typically it retains it orientation.

The orientation check device 78 includes a probe 80 which has a downwardly depending projection 82. Probe 80 moves downwardly and if the assembled blank and pin are in the proper angular orientation, projection 82 will be received within the offset hole 20 in the blank 10. However, if the blank is not in the proper angular orientation, projection 82 will hit the upper surface 22 of blank 10. The orientation check device 78 has a proximity switch 84 which senses the position of probe 80 to indicate to the control system whether the assembled blank and pin are in the proper angular orientation.

Figures 12, 13, 14, 15:
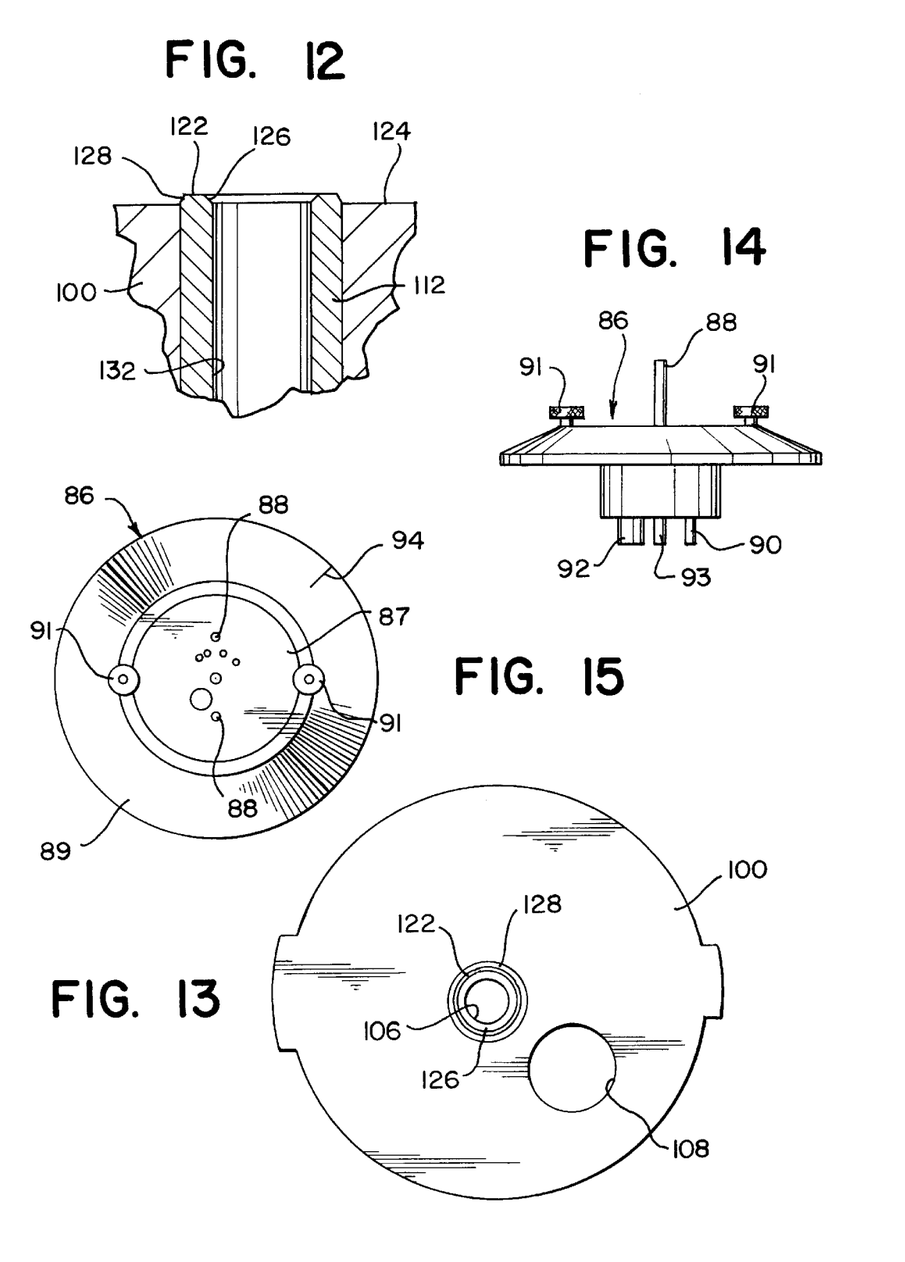
FIG. 12 is an enlarged view of the insert sleeve of the bottom punch.
FIG. 13 is a top view of the bottom punch.
FIG. 14 is a side view of a hand encoder.
FIG. 15 is a top view of the hand encoder.

Once the probe 80 has retracted, the properly oriented blank and pin moves from station number six to station number seven. If, however, the assembled blank and pin are in an improper angular orientation as detected by sensor 84, the assembled blank and pin can then be manually rotated to the proper orientation by the use of a hand encoder 86 which is illustrated in FIGS. 14 and 15.

The hand encoder has a handle 88, in the form of two upwardly extending rods disposed on an upper surface, and three downwardly depending projections 90, 92, 93 which can only be received in one angular position within offset bores 20, 21, 23 of blank 10, respectively. The encoder also includes a mark 94 which is to be aligned with respect to a mark 96 on the rotary table 42. Thus, upon detection that the assembled blank and pin are not in the proper angular position by sensor 84, a user can manually use tool 86, by first placing this tool within cylinder 50 at station number 6, and after projections 90, 92, 93 are received within bores 20, 21, 23, tool 86 can be rotated so that mark 94 aligns with mark 96 on the rotary table. After properly setting the angular orientation of the assembled blank and pin, the user can then reset the rotary table for automatic operation.

Hand encoder 86 is preferably comprised of two parts, cylinder 87 and flange 89, which are fixedly connected together by set screws 91. To adjust the predetermined angular position of the assembled blank and pin with respect to cylinder 50, the relative angular position of cylinder 87 with respect to flange 89 can be set by first unthreading set screws 91, then adjusting the relative angular orientation of cylinder 87 and flange 89, and then rethreading set screws 91, Thus, the assembled blank and pin can be positioned at any predetermined angular position with respect to cylinder 50 by hand encoder 86.

Figure 8:
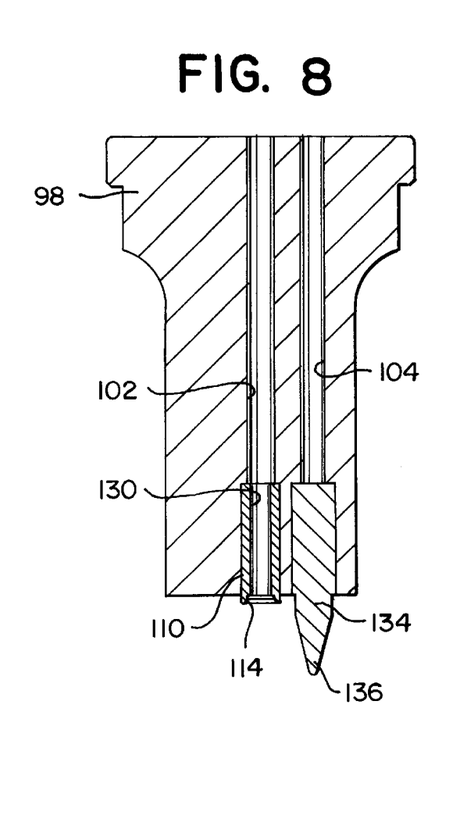
FIG. 8 is a sectional view of the top punch of station number seven of the rotating table.
Figure 9:
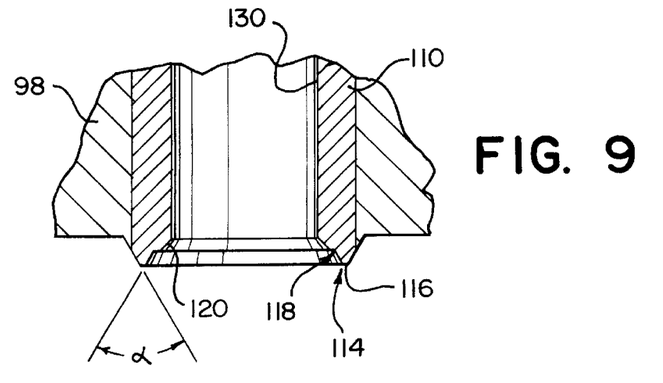
FIG. 9 is an enlarged view of the insert sleeve of the top punch.
Figure 10:
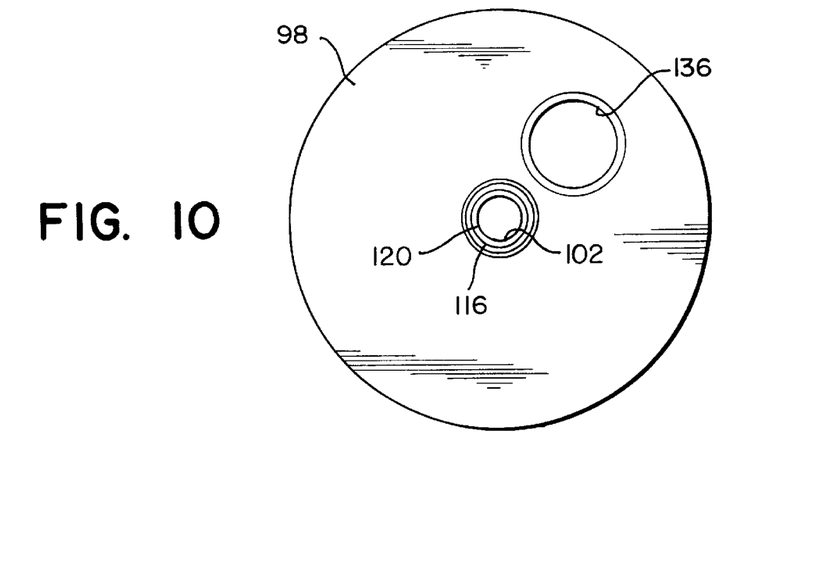
FIG. 10 is a bottom view of the top punch.
Figure 11:
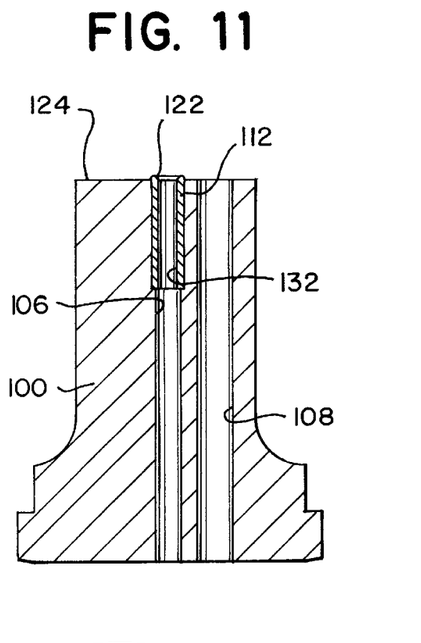
FIG. 11 is a cross sectional view of the bottom punch.

The coin fit automated station number seven permanently joins pin 12 to the metal powder blank 10. The coining apparatus is shown in greater detail in FIGS. 7–13. The coining apparatus includes a top punch 98 and a bottom punch 100. Upper punch 98 has a central throughbore 102 and an offset throughbore 104 that are respectively aligned with the central throughbore 14 and offset throughbore 20 of blank 10 (FIG. 8). Additionally, lower punch 100 has a central throughbore 106 and an offset throughbore 108 that are also respectively aligned with the central bore 14 and offset bore 20 of blank 10 (FIG. 11). A carbide insert sleeve 110 is fixedly disposed within the lower distal end of bore 102 and a carbide insert sleeve 112 is fixedly disposed within the upper axial end of bore 106. The axial free end 114 of sleeve 110 forms an annular blunt ring or nose 116 (FIG. 9). Blunt ring 116 preferably forms an angle α of approximately 60°. The axial free end 114 angles radially inwardly from ring 116 to a stepped shoulder surface 118 which leads to a chamfered surface 120. Chamfer surface 120 is preferably angled at approximately 45° with respect to a line parallel to the longitudinal axis of bore 102. Upper punch 98 (FIG. 8) includes a guide pointer 134 disposed within the lower end of bore 104. Pointer 134 has a downwardly depending projection 136 which is sized to be received within offset bore 20 in blank 10 and offset bore 108 in the lower punch 100, respectively. Thus, pointer 134 assures that blank 10 will not move radially during the coining (i.e., pressing) process.

Sleeve 112 (FIG. 12) has a distal end 122 that protrudes slightly above the top flat surface 124 of lower punch 100. The axial end surface of 122 of sleeve 112 is substantially flat and includes a beveled inner surface 126 and a beveled outer surface 128 to define the transition to the inner and outer cylindrical surfaces of sleeve 112, respectively. Bevel 126 is preferably disposed at an angle of approximately 45° with respect to a line parallel to the longitudinal axis of bore 106 and bevel 128 is preferably disposed at an angle of approximately 30° with respect to a line parallel to the longitudinal bore 106. Sleeves 110, 112 each have an inner cylindrical surface 130, 132, respectively, which have a very precise inner diameter so that pin 12 fits tightly within sleeves 110, 112.

Figure 4:
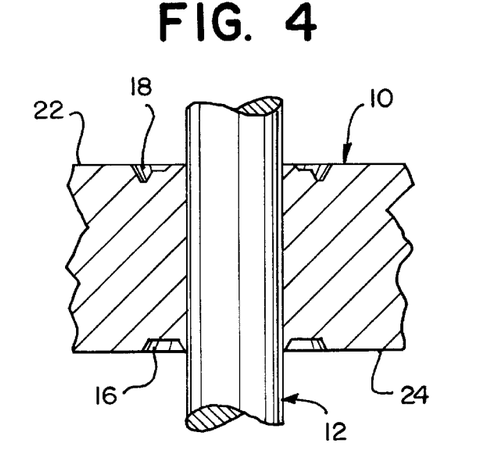
FIG. 4 is a cross-sectional view, similar to FIG. 2 showing the pin and blank joined together.

In operation, the properly angularly oriented and assembled blank and pin is first moved to station number seven. The upper punch 98 moves downwardly and projection 136 of guide pointer 134 is received within offset bore 20 of blank 10 and then within offset bore 108 of lower punch 100. The axial free end 114 of sleeve 110 then contacts the upper free end of pin 12 and pushes the pin downwardly through the blank until top punch 98 reaches a stop which accurately sets the height of the pin with respect to the blank such that only a small portion of the upper end of the pin 12 protrudes above the upper surface of blank 10. The pin and blank are thereafter moved downwardly together so that the lower end of pin 12 is received within sleeve 112 of the bottom punch 100. Because of the precise alignment of the inner cylindrical bore 132 of sleeve 112, pin 12 is held perpendicularly with respect to the planar surfaces of blank 10. Thereafter, the bottom punch 100 is raised so that the carbide insert sleeves 110, 112 push or compress on a chamfer portion 16, 18 of the center hole 14 of the blank 10 (FIG. 4) and a portion of the planar surfaces 22, 24 adjacent to the center hole 14, thereby locally densifying the blank. The compressing force applied by the bottom and top punch flattens or compresses the blank 10 with sufficient force so that pin 12 is fixedly joined to blank 10 as is illustrated in FIG. 4, while the planar surfaces 22, 24 are simultaneously pressed to have a predetermined flatness. Thereafter, the top press assembly is raised. A cylinder causes the bottom punch to rise thus lifting the now joined blank and pin so that the joined blank and pin is placed within cylinder 50, adjacent to the upper ring of magnets 62, as illustrated in station number eight in FIG. 7.

As discussed above, the joined blank and pin has, in accordance with a preferred embodiment of the present invention, a deviation from perpendicularity of less than or equal approximately to 0.00120" at a distance of approximately 0.4" from the planar first surface. More preferably, the deviation from perpendicularity is less than or equal to approximately 0.00110", and even more preferably less than or equal to approximately 0.00080", and yet even more preferably less than approximately 0.00050" all at a distance of approximately 0.4" from the planar surface of the blank. The deviation from perpendicularity is known in the art as a perpendicularity measurement of the joined pin and blank. Referring now to FIG. 16, the deviation from perpendicularity is schematically illustrated. Assume that the x-axis is the planar surface of the blank and that the y-axis is the true perpendicular axis from the planar surface. Dashed line 150 represent the axis of the pin that has been joined to the blank. $Y_1$ represents a distance of approximately 0.4" from the x-axis (i.e., from the planar surface). $X_1$, thus, represents the deviation from perpendicularity at a distance of approximately 0.4" from the planar surface of the blank. It should be noted that the deviation from perpendicularity is linear, and the choice of approximately 0.4" from the planar surface is purely arbitrary. Thus, if $Y_1$ is approximately 0.8", the deviation would be $2X_1$.

In accordance with a further embodiment, for a deviation of perpendicularity of less than or equal to approximately 0.00080" (i.e., the process limit), a capability index (Cpk) of a sample number of joined pins to blanks is greater than or equal to approximately 1.33. Cpk is determined by measuring the deviation from perpendicularity of a sample number of joined pins and blanks. To ensure statistical accuracy, a short term capability study should comprise of at least a thirty piece histogram, and preferably greater than forty, depending upon population size. The average deviation ($\overline{X}$) and the standard deviation ($\sigma$) are calculated from the measured deviation of each one of the sample, in a manner known to those skilled in the art. Then, the capability index (Cpk) can be calculated from the following equation:

$$Cpk=[\text{Process limit}-\overline{X}]\div 3\sigma$$

The flatness of the planar first surface of the blank is preferably less than or equal to approximately 0.0005". The flatness is the measurement along the true perpendicular axis from the lowest valley in surface 22, 24 of the blank to the highest peak in surface 22, 24.

In accordance with a further preferred embodiment of the present invention, the pin is joined to the blank by compressing the blank such that for a process limit of approximately 0.00120" at a distance of approximately 0.4" from the planar surface of the blank, the capability index (Cpk) of a sample of the joined pins to blanks is greater than or equal to approximately 1.33, and preferably greater than or equal to approximately 1.66, and even more preferably greater than or equal to approximately 2.00.

In accordance with a further preferred embodiment of the present invention, for a process limit of approximately 0.00010" at a distance of approximately 0.4" from the planar surface of the blank, the capability index is greater than or equal to approximately 1.66, and more preferably greater than or equal to approximately 2.00.

In accordance with a further preferred embodiment of the present invention, for a process limit of approximately 0.00008" at a distance of approximately 0.4" from the planar surface of the blank, the capability index is greater than or equal to approximately 1.33.

As illustrated in FIG. 7, station numbers eight and nine are free stations. Station number ten is an unload station and includes an unloading cylinder housing 138, which includes an axially movable plunger 140. When plunger 140 moves downwardly the joined blank and pin are pushed out of cylinder 50. Cylinder housing 138 includes a pair of sensors 142, 144 which respectively detect when the joined blank and pin have been moved out of the cylinder 50 and when the cylinder 140 has been withdrawn sufficiently so that the rotary table can rotate freely once again.

The rotary table 42 can be driven, for example, by a mechanical chain drive linkage and the rotation thereof is controlled by the control system. The rotation shaft for the rotary table can include an encoder to indicate the angular position of the rotary table.

Having described the presently preferred exemplary embodiment of a new and improved method and apparatus for joining a powder metal blank to a pin, in accordance with the present invention, it is believed that other modifications, variations and changes will be suggested to those skilled in the art in view of the teachings set forth herein. For example, the pin could be powdered metal with a flange and the blank could be pure metal, with the pressing operation causing the compression of the pin flange to fasten the parts together. Also, shape other than blanks and pins can be joined, so long as one is of powdered metal. It is, therefore, to be understood that all such modifications, variations, and changes are believed to fall within the scope of the present invention as defined by the appended claims.

What is claimed is:

1. An apparatus comprising:
   a blank being made of press metal and having a substantially planar first surface and a center throughbore;
   a pin being received in said center throughbore, said pin being fixedly joined to said blank by compressing and locally densifying said blank such that a deviation from perpendicularity of the joined pin to the blank being less than or equal to approximately 0.00120" at a distance of approximately 0.4" from said planar first surface.

2. The apparatus according to claim 1, wherein the deviation from perpendicularity is less than or equal to approximately 0.00110".

3. The apparatus according to claim 2, wherein the deviation from perpendicularity is less than or equal to approximately 0.00100".

4. The apparatus according to claim 3, wherein the deviation from perpendicularity is less than or equal to approximately 0.00080".

5. The apparatus according to claim 4, wherein the deviation from perpendicularity is less than or equal to approximately 0.00050".

6. The apparatus according to claim 1, wherein the flatness of the planar first surface of the blank is less than or equal to approximately 0.0005".

7. The apparatus according to claim 2, wherein the flatness of the planar first surface of the blank is less than or equal to approximately 0.0005".

8. The apparatus according to claim 3, wherein the flatness of the planar first surface of the blank is less than or equal to approximately 0.0005".

9. The apparatus according to claim 4, wherein the flatness of the planar first surface of the blank is less than or equal to approximately 0.0005".

10. The apparatus according to claim 5, wherein the flatness of the planar first surface of the blank is less than or equal to approximately 0.0005".

11. An apparatus comprising:
    a blank being made of press metal and having a substantially planar first surface and a center throughbore;
    a pin being received in said center throughbore, said pin being fixedly joined to said blank by compressing and locally densifying said blank such that for a process limit of approximately 0.00120" at a distance of approximately 0.4" from said planar first surface, a capability index (Cpk) of a sample of joined pins to blanks is greater than or equal to approximately 1.33, where Cpk=[process limit-$\overline{X}$]÷3$\sigma$, where $\overline{X}$ equals the average of the deviation from perpendicularity of the sample and $\sigma$ is the standard deviation of the deviation from perpendicularity of the sample.

12. The apparatus according to claim 11, wherein the capability index is greater than or equal to approximately 1.66.

13. The apparatus according to claim 12, wherein the capability index is greater than or equal to approximately 2.00.

14. The apparatus according to claim 11, wherein the flatness of the planar first surface of the blank is less than or equal to approximately 0.0005".

15. The apparatus according to claim 12, wherein the flatness of the planar first surface of the blank is less than or equal to approximately 0.0005".

16. The apparatus according to claim 13, wherein the flatness of the planar first surface of the blank is less than or equal to approximately 0.0005".

17. An apparatus comprising:
a blank being made of press metal and having a substantially planar first surface and a center throughbore;
a pin being received in said center throughbore, said pin being fixedly joined to said blank by compressing and locally densifying said blank such that for a process limit of approximately 0.00100" at a distance of approximately 0.4" from said planar first surface, a capability index (Cpk) of a sample of joined pins to blanks is greater than or equal to approximately 1.33, where Cpk=[process limit$-\overline{X}$]$\div 3\sigma$, where $\overline{X}$ equals the average of the deviation from perpendicularity of the sample and $\sigma$ is the standard deviation of the deviation from perpendicularity of the sample.

18. The apparatus according to claim 17, wherein the capability index is greater than or equal to approximately 1.66.

19. The apparatus according to claim 17, wherein the flatness of the planar first surface of the blank is less than or equal to approximately 0.0005".

20. The apparatus according to claim 18, wherein the flatness of the planar first surface of the blank is less than or equal to approximately 0.0005".

21. An apparatus comprising:
a blank being made of press metal and having a substantially planar first surface and a center throughbore;
a pin being received in said center throughbore, said pin being fixedly joined to said blank by compressing and locally densifying said blank such that for a process limit of approximately 0.00080" at a distance of approximately 0.4" from said planar first surface, a capability index (Cpk) of a sample of joined pins to blanks is greater than or equal to approximately 1.33, where Cpk=[process limit$-\overline{X}$]$\div 3\sigma$, where $\overline{X}$ equals the average of the deviation from perpendicularity of the sample and $\sigma$ is the standard deviation of the deviation from perpendicularity of the sample.

22. The apparatus according to claim 21, wherein the flatness of the planar first surface of the blank is less than or equal to approximately 0.0005".

\* \* \* \* \*